United States Patent [19]

Makino et al.

[11] 4,440,643

[45] Apr. 3, 1984

[54] PROCESS FOR PRODUCING AROMATIC POLYIMIDE COMPOSITE SEPARATING MEMBRANE

[75] Inventors: Hiroshi Makino; Yoshihiro Kusuki; Takashi Harada; Hiroshi Shimazaki; Tosio Isida, all of Ichihara, Japan

[73] Assignee: Ube Industries, Ltd., Chiba, Japan

[21] Appl. No.: 387,493

[22] Filed: Jun. 11, 1982

[30] Foreign Application Priority Data

Jun. 22, 1981 [JP] Japan ................................. 56-95389

[51] Int. Cl.$^3$ ...................... B01D 39/00; B01D 39/14; B05D 3/02
[52] U.S. Cl. .................................... 210/500.2; 55/158; 427/379; 427/393.5; 428/473.5; 528/353
[58] Field of Search ................. 55/16, 158; 210/500.2; 428/473.5; 427/393.5, 379; 528/353

[56] References Cited

U.S. PATENT DOCUMENTS

| | | | |
|---|---|---|---|
| 4,240,914 | 12/1980 | Iwama et al. | 428/473.5 |
| 4,271,288 | 6/1981 | Woo | 528/353 |
| 4,347,286 | 8/1982 | Ishizaka et al. | 428/473.5 |
| 4,358,581 | 11/1982 | Sutton | 528/353 |

Primary Examiner—Michael R. Lusignan
Attorney, Agent, or Firm—Burgess, Ryan & Wayne

[57] ABSTRACT

An aromatic polyimide composite membrane having an excellent gas-separating property is produced by a process comprising the steps of: coating at least one surface of a substrate consisting of an aromatic polyimide porous membrane with a solution of 0.05% to 10% by weight of an aromatic polyamic acid in a polar organic solvent, which is not capable of dissolving the polyimide porous membrane, at a temperature not exceeding 140° C.; after a during drying the resultant thin coating layer of the polyamic acid solution, heating the resultant polyamic acid layer at a temperature of 150° C. or more so as to convert the polyamic acid layer to the corresponding polyimide layer.

20 Claims, No Drawings

PROCESS FOR PRODUCING AROMATIC POLYIMIDE COMPOSITE SEPARATING MEMBRANE

FIELD OF THE INVENTION

The present invention relates to a process for producing an aromatic polyimide composite separating membrane, more particularly a process for producing an aromatic polyimide composite membrane having an enhanced gaspermeating rate and excellent gas-separating property, heat resistance, and mechanical strength.

The composite separating membrane of the present invention is composed of a substrate consisting of an aromatic polyimide porous membrane and at least one dense coating layer consisting of an aromatic polyimide and formed on at least one surface of the substrate so as to form one body of composite membrane.

The composite separating membrane of the present invention may be in the form of a flat film or a hollow fiber or tube.

BACKGROUND OF THE INVENTION

A process for producing an aromatic polyimide separating membrane is disclosed, for example, in Japanese Patent Application Laid-Open (Kokai) No. 49-45152. In this process, a homogeneous solution containing an aromatic polyamic acid dissolved in a solvent is used as a dope solution for forming a membrane. A liquid mixture containing an imide-cyclization composition prepared from a lower aliphatic carboxylic acid or its anhydride and a tertiary amine is used as a coagulating liquid for the dope solution. A thin layer of the dope solution is formed on a smooth surface of a membrane-forming substrate by means of a wet membrane-forming method and, then, is coagulated by the coagulating liquid while the polyamic acid is converted to the corresponding polyimide, so as to provide a polyimide asymmetric membrane.

In the above-mentioned membrane-forming method, however, since the coagulation of the thin layer of the dope solution and the imide-cyclization of the polyamic acid in the dope solution are simultaneously carried out, it is difficult to obtain an aromatic polyimide membrane having a satisfactory, uniform gas-separating property with satisfactory reproductivity. That is, the products of the above-mentioned conventional membrane-forming method sometimes exhibit an uneven gas-separating property and/or an unsatisfactory gas-permeating rate.

Accordingly, there has been a great demand for a process of producing an aromatic polyimide membrane having excellent gas-separating properties with excellent reproductivity.

SUMMARY OF THE INVENTION

An object of the present invention is to provide a process for producing an aromatic polyimide composite separating membrane having an excellent gas-permeating rate and gas-separating property in addition to excellent heat resistance and mechanical strength.

Another object of the present invention is to provide a process for reproducibly producing an aromatic polyimide composite separating membrane.

The above-mentioned objects can be attained by the process of the present invention, which comprises the steps of:

coating at least one surface of a porous membrane substrate comprised of an aromatic polyimide with a homogeneous solution containing 0.05% to 10% by weight of an aromatic polyamic acid dissolved in an organic polar solvent capable of dissolving the polyamic acid therein, but not capable of dissolving the polyimide membrane substrate, at a temperature of 140° C. or less, to form a thin layer of the polyamic acid solution; and after or during drying the thin layer of the polyamic acid solution by evaporating the solvent therefrom, heating the resultant polyamic acid layer at a temperature of 150° C. or more, whereby the amide-acid structure in the polyamic acid is imide-cyclized to convert the polyamic acid coating layer to the corresponding polyimide coating layer.

DETAILED DESCRIPTION OF THE INVENTION

In the process of the present invention, at least one thin layer of an aromatic polyimide is formed or at least one surface of a substrate consisting of a porous aromatic polyimide membrane.

The aromatic polyimide in the porous membrane substrate is a polymerization-imidization product of an aromatic tetracarboxylic acid component and an aromatic diamine component and usually contains at least 80 molar % of at least one type of recurring unit of the formula (I):

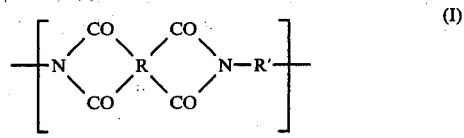

wherein R represents an aromatic tetravalent radical and R' represents an aromatic divalent radical.

Preferably, the porous aromatic polyimide membrane substrate usable for the process of the present invention exhibits a hydrogen gas-permeability ($P_{H2}$) of $5 \times 10^{-5}$ to $5 \times 10^{-1}$ cm$^3$/cm$^2$.sec.cmHg, more preferably, $5 \times 10^{-4}$ to $1 \times 10^{-2}$ cm$^3$/cm$^2$.sec.cmHg, and a ratio of the hydrogen gas-permeability ($P_{H2}$) to a carbon monoxide gas-permeability ($P_{CO}$) of 2 to 10, more preferably, 2.5 to 5.

The porous polyimide membrane substrate can be produced by means of any aromatic polyimide membrane-forming methods.

For example, an aromatic polyamic acid or an aromatic polyimide which has been prepared by the polymerization of an aromatic tetracarboxylic acid component and an aromatic diamine component, is homogeneously dissolved in an organic polar solvent, which may be a mixture of a base solvent capable of dissolving the polyamic acid or the polyimide with an additional solvent incapable of dissolving the polyamic acid or the polyimide; the resultant dope solution is cast to form a thin layer of the dope solution, which may be in the form of a flat film or a hollow fiber or tube; and the thin layer of the dope solution is solidified by evaporating the solvent, if necessary, while the polyamic acid is converted to the corresponding polyimide at an elevated temperature.

In another process, a polyamic acid or polyimide which has been prepared by the polymerization of an aromatic tetracarboxylic acid component and an aromatic diamine component at a low temperature is dissolved in an organic polar solvent; the resultant dope solution is cast to form a thin layer thereof which may be in the form of a flat film or a hollow fiber or tube; the thin layer of the dope solution is introduced into a coagulating liquid containing water and/or a lower aliphatic alcohol; the resultant coagulated membrane is dried, if necessary, while the coagulated membrane is heated at an elevated temperature, so as to convert the polyamic acid in the membrane to the corresponding polyimide.

In the recurring unit of the formula (I), the aromatic tetravalent radical represented by R may be a residue of an aromatic tetracarboxylic acid from which the four carboxylic acid moieties have been excluded. Also, the aromatic divalent residue represented by R' in the formula (I) may be a residue of an aromatic diamine from which the two amino moieties have been excluded.

The aromatic tetracarboxylic acid component consists essentially of at least one member selected from the group consisting of biphenyl tetracarboxylic acids, for example, 3,3',4,4'-biphenyl tetracarboxylic acid and 2,3,3',4'-biphenyltetracarboxylic acid; benzophenone tetracarboxylic acids, for example, 3,3',4,4'-benzophenone tetracarboxylic acid; 2,2-bis(dicarboxyphenyl)propane; bis(3,4-dicarboxyphenyl)methane; bis(3,4-dicarboxyphenyl)sulfone; bis(3,4-dicarboxyphenyl)ether; bis(3,4-dicarboxyphenyl)thioether; pyromellitic acid; and acid anhydrides, salts, and lower alcohol esters of the above-mentioned acids.

The aromatic diamine component consists essentially of at least one member selected from the group consisting of those of the formulae (II) through (V)

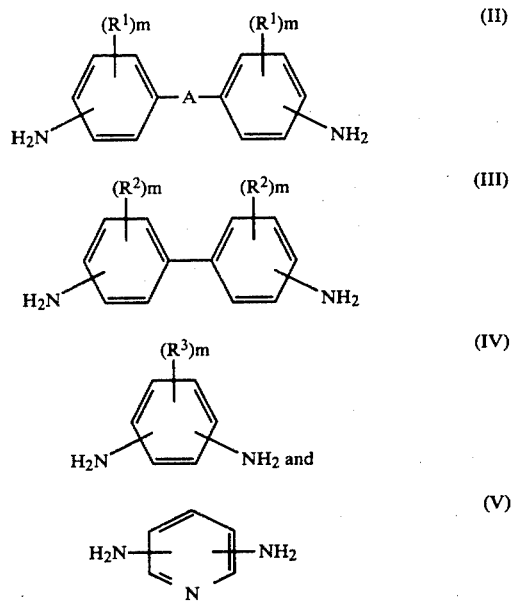

wherein $R^1$, $R^2$, and $R^3$ each represent, independently from each other, a member selected from the group consisting of hydrogen atom, lower alkyl radicals having 1 to 3 carbon atoms, and lower alkoxyl radicals having 1 to 3 carbon atoms; A represents a divalent linking member selected from the class consisting of —O—, —S—, —CO—, —SO$_2$—, —SO—, —CH$_2$—, and —C(CH$_3$)$_2$—; and m represents an integer of from 1 to 4.

The aromatic diamines of the formula (II) may involve: diphenyl ether compounds, for example, 4,4'-diaminodiphenyl ether (hereinafter referred to as DADE for brevity), 3,3'-dimethyl-4,4'-diaminodiphenyl ether, 3,3'-dimethoxy-4,4'-diaminodiphenyl ether, 3,3'-diaminodiphenyl ether, and 3,3'-diaminodiphenyl ether; diphenyl thioether compounds, for example, 4,4'-diaminodiphenyl thioether, 3,3'-dimethyl-4,4'-diamionodiphenyl thioether, 3,3'-dimethoxy-4,4'-diaminodiphenyl thioether, and 3,3'-diaminodiphenyl ether; benzophenone compounds, for example, 4,4'-diaminobenzophenone and 3,3'-dimethyl-4,4'-diaminobenzophenone; diphenyl methane compounds, for example, 3,3'-diaminodiphenyl methane, 4,4'-diaminodiphenyl methane (hereinafter referred to as DADM for brevity); 3,3'-dimethoxy-4,4'-diaminodiphenyl methane, and 3,3'-dimethyl-4,4'-diaminodiphenyl methane; bisphenyl propane compounds, for example, 2,2-bis(4-aminophenyl)propane and 2,2-bis(3-aminophenyl)propane; 4,4'-diaminophenyl sulfoxide; 4,4'-diaminodiphenyl sulfone; and 3,3'-diamino-diphenyl sulfone.

The aromatic diamines of the formula (III) may involve 3,3'-dimethyl benzidine, 3,3'-dimethoxybenzidine (orthodianisidine), and 3,3'-diaminobiphenyl.

The diamine of the formula (IV) is selected from O-, m-, and p-phenylene diamines. The aromatic diamines of the formula (V) may be selected from 2,6-diaminopyridine, 2,5-diaminopyridine, and 3,4-diaminopyridine.

It is also preferable that the aromatic polyimide in the porous membrane substrate be prepared by polymerizing and imidizing an equimolar amount of an aromatic tetracarboxylic acid component consisting of at least one member selected from biphenyl tetracarboxylic acid, benzophenone tetracarboxylic acids, and dianhydrids of the abovementioned acid and an aromatic diamine component consisting of at least one diamine compound having two aromatic rings; by dissolving the resultant polyimide in a phenolic solvent consisting of phenol, cresol, xylenol, a halogenated phenol, and/or a halogenated cresol; by shaping the resultant dope solution into a thin layer thereof; and by coagulating the thin dope solution layer in a coagulating liquid or by solidifying it by evaporating the solvent.

If the polyimide is substantially insoluble in any organic polar solvents, the corresponding polyamic acid which is a precursory polymer of the polyamide is homogeneously dissolved in an organic polar solvent. The resultant dope solution containing the polyamic acid is used to form a thin layer of the polyamic acid. The thin polyamic acid layer is coagulated or dried and, then, heated to an elevated temperature to form a polyimide membrane.

In the process of the present invention, it is preferable that the gas-permeating rate of the aromatic polyimide membrane substrate be maintained at a satisfactory level even at an elevated temperature of 200° C. or more and even under an increased pressure of approximately 100 kg/cm$^2$.

The thickness of the aromatic polyimide membrane substrate is not limited to a specific value as long as the membrane substrate has a satisfactory mechanical strength in actual use. Usually, it is preferable that the membrane substrate have a thickness of from 2 to 500 microns, more preferably, from 5 to 300 microns.

In the process of the present invention, at least one surface of the aromatic polyimide membrane substrate is coated with a homogeneous solution containing 0.05% to 10% by weight of an aromatic polyamic acid dissolved in an organic polar solvent at a temperature of 140° C. or less so as to provide a thin layer of the polyamic acid solution. The organic polar solvent dissolves therein the polyamic acid, but cannot dissolve therein the aromatic polyimide membrane substrate.

The aromatic polyamic acid usable for the process of the present invention has a large molecular weight and can be prepared by the polymerization of an aromatic tetracarboxylic acid component and an aromatic diamine component dissolved in a polar organic solvent at a relatively low temperature of 120° C. or less, preferably, 100° C. or less.

The polyamic acid preferably contains at least 60 molar %, more preferably 70% to 100 molar %, of at least one type of recurring unit of the formula (VI):

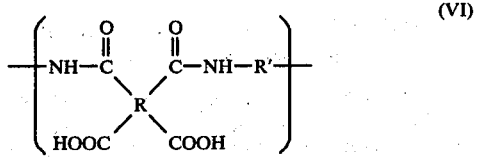

wherein R and R' are the same as defined above.

It is preferable that the polyamic acid exhibits a logarithmic viscosity of from 0.1 to 7, more preferably from 0.2 to 5, determined in a concentration of 0.5 g per 100 ml of N-methyl-2-pyrrolidone at a temperature of 30° C.

The aromatic tetracarboxylic acid compounds and the aromatic diamine compounds usable for the preparation of the polyamic acid may be the same as those usable for the preparation of the aromatic polyamide for the membrane substrate.

The polar organic solvent usable for the preparation of the polyamic acid comprises, as a principal component, at least one member selected from the group consisting of amide type liquid compounds, for example, acetamide, formamide, N-methyl-2-pyrolidone, N,N-dimethylacetamide, N,N-diethylacetamide, N,N-dimethylformamide, N,N-diethylformamide, and N-methylcaprolactam; alkylsulfoxides, for example, dimethylsulfoxide and diethylsulfoxide; alkylureas, for example, tetramethyl urea and tetraethyl urea; cyclic ether compounds, for example, dioxiane and trioxane; and glycol compounds, for example, ethylene glycol, ethylene glycol monomethyl ester and ethylene glycol dimethyl ester.

The polar organic solvent may consist of a single compound or a mixture of two or more compounds.

The aromatic polyamic acid dope solution to be applied to the membrane substrate surface may consist of the polymerization mixture itself or the polymerization mixture diluted with an additional amount of the polar organic solvent or concentrated by evaporating a portion of the polar organic solvent.

In another method, the aromatic polyamic acid dope solution can be prepared by isolating the aromatic polyamic acid from the polymerization mixture and, then, by homogeneously dissolving the isolated aromatic polyamic acid in a necessary amount of the polar organic solvent.

The polar organic solvent usable for the polyamic acid dope solution may contain a small amount, for example, 50% by weight or less, of an additional component consisting of at least one member selected from the group consisting of methyl alcohol, ethyl alcohol, benzene, toluene, xylene, cyclohexane, methylene chloride, chloroform, tetrahydrofuran, methylethyl ketone, and carbon disulfide.

It is preferable that the dope solution of the polyamic acid have a concentration which corresponds to a rotation viscosity of the dope solution of 0.01 to 1000 poise, more preferably, 0.1 to 500 poise, determined at a temperature of 30° C.

In the process of the present invention, if the concentration of the aromatic polyamic acid in the dope solution is excessively small, it will be difficult to stably form a uniform dense coating layer of the aromatic polyimide on the entire surface of the aromatic polyimide membrane substrate. Also, the resultant composite membrane will exhibit an unsatisfactory gas permeating property. If the concentration of the aromatic polyamic acid in the dope solution is excessively large, the resultant composite membrane will have an undesirably thick aromatic polyimide coating layer and, therefore, will exhibit an unsatisfactory gas-permeating rate.

In the process of the present invention, it is important that the aromatic polyamic acid dope solution be coated on the aromatic polyimide membrane substrate at a temperature of 140° C. or less, preferably, 120° C. or less, more preferably, 100° C. or less, at which temperature the dope solution can be maintained in the state of a liquid.

The coating operation of the aromatic polyamic acid dope solution on the aromatic polyimide membrane substrate surface can be carried out by any conventional coating method. For example, the dope solution is spread on a surface of the aromatic polyimide membrane substrate so as to form a thin layer of the dope solution having a uniform thickness. In another method, the dope solution is sprayed onto the surface of the substrate. In still another method, the dope solution is coated on a peripheral surface of a rotatable roll, and a surface of the aromatic polyimide membrane substrate is brought into contact with the peripheral surface of the roll so as to transfer the thin layer of the dope solution from the peripheral surface of the roll to the surface of the substrate. In still another method, the aromatic polyimide membrane substrate is immersed in the dope solution and taken out therefrom.

The thickness of the coated layer of the polyamic acid on the substrate surface is preferably in the range of from 0.1 to 200 microns, more preferably, from 1 to 100 microns, still more preferably, from 2 to 80 microns.

For the purpose of forming a thin layer of the dope solution which does not penetrate into the aromatic polyimide porous membrane substrate, it is preferable that the porous membrane substrate be impregnated with a volatile liquid consisting of a low aliphatic alcohol, lower aliphatic ketone, benzene compound, lower aliphatic ester, aliphatic hydrocarbon, or a cycloaliphatic hydrocarbon before the porous membrane substrate is coated with the polyamic acid dope solution.

In the process of the present invention, the coated thin layer of the polyamic acid dope solution is dried by evaporating the solvent therefrom. After or during the drying procedure, the polyamic acid on the membrane substrate surface is heated to a temperature of 150° C. or more, preferably, 160° C. to 300° C., more preferably, 170° C. to 260° C., so as to convert the polyamic acid to the corresponding polyimide by imide-cyclizing the amide-acid structure in the polyamic acid. As a result of the heating procedure, a dense polyimide coating layer is formed on the surface of the polyimide membrane substrate.

The drying procedure for the coated thin layer of the aromatic polyamic acid dope solution is carried out preferably at a temperature of from 30° C. to 150° C., more preferably, from 50° C. to 140° C., in an inert gas atmosphere. The drying procedure may be carried out under a reduced pressure at the above-mentioned temperature. It is not always necessary to completely remove the solvent from the coated dope solution layer in the drying procedure. Even if a small amount of the solvent remains, if the resultant dried coating layer is in the state of a solid, the dried coated layer can be subjected to heating procedure at a temperature of 150° C. or more.

In the heating procedure, it is preferable that the heating temperature be not higher than 400° C. If the heating temperature is excessively high, it sometimes reduces the gas-permeating rate of the porous membrane substrate. Accordingly, it is preferable that the heating temperature be as low as possible, for example, in the range of from 160° to 300° C., more preferably, from 170° to 260° C., as long as the amide-acid structure in the polyamic acid in the dried coating layer can be substantially imidecyclized within an adequate time.

In the heating procedure, the heating time is variable depending on the heating temperature. That is, the higher the heating temperature, the shorter the heating time. When the heating temperature is in the range of from 170° C. to 260° C., the heating time is preferable in the range of from 0.1 to 20 hours, more preferably, from 0.2 to 10 hours.

The aromatic polyimide composite separating membrane produced in accordance with the process of the present invention comprises an aromatic polyimide porous membrane substrate having a thickness of preferably from 2 to 500 microns, more preferably, from 5 to 300 microns, and at least one aromatic polyimide dense coating layer formed on the porous membrane substrate. That is, both the porous membrane substrate and the dense coating layer consist of aromatic polyimides which may be of the same or different type from each other. Therefore, the composite membrane can be used to separate two or more types of gases from each other at a temperature of from room temperature to approximately 200° C.

Also, it is important that the composite separating membrane produced in accordance with the process of the present invention exhibit both an excellent gas-permeating rate and a superior gas-separating property. For example, the composite membrane of the present invention exhibits a hydrogen gas-permeability ($P_{H_2}$) of $1 \times 10^{-6}$ cm$^3$/cm$^2$.sec.cmHg or more and a ratio ($P_{H_2}/P_{CO}$) of the hydrogen gas-permeability ($P_{H_2}$) to carbon monoxide gas-permeability ($P_{CO}$) of from 25 to 100, which ratio ($P_{H_2}/P_{CO}$) represents the gas-separating property of the composite membrane.

SPECIFIC EXAMPLES

Examples of the present invention and comparative examples are illustrated below.

In the examples and comparative examples, the gas-permeability (permeating rate) of the imide polymer membrane was determined by means of the following gas-transmission test. The membrane to be tested was placed in a stainless steel cell having a permeating area of 14.65 cm$^2$, and hydrogen gas and carbon monoxide gas were supplied separately to the cell at a temperature of 30° C. under a pressure of 3.0 kg/cm$^2$G. The amount (volume) of gas passed through the membrane was measured with a flowmeter.

The gas-permeability (P) of each gas was calculated from the following equation:

$$\text{Gas-permeability } (P) \text{ (cm}^3\text{/cm}^2 \cdot \text{sec} \cdot \text{cmHg)} = \frac{X}{A \times T \times D}$$

wherein X represents the amount (volume) in cm$^3$ (STP) of gas passed through the membrane, A represents the permeating surface area in cm$^2$ of the membrane through which the gas passed, T represents the transmission time in seconds of the gas passed through the membrane, and D represents the difference in pressure in cmHg between the gas-supply side and the opposite side of the membrane.

EXAMPLE 1 (PREPARATION OF POROUS MEMBRANE SUBSTRATE)

A separable flask equipped with a stirrer and with a conduit for introducing thereinto nitrogen gas, was charged with 40 millimoles of 3,3',4,4'-biphenyl tetracarboxylic dianhydride (S-BPDA), 40 millimoles of 4,4'-diaminodiphenyl ether (DADE), and 165 g of para-chlorophenol. The reaction mixture was subjected to a single step polymerization and imidization procedure in which the reaction mixture was heated to a temperature of 180° C. over approximately 50 minutes and then maintained at this temperature for 8 hours while flowing nitrogen gas through the flask. A viscous polyimide solution was obtained.

The polyimide solution contained 10% by weight of the resultant polymer having a degree of imidization of 95% or more and a logarithmic viscosity of 2.2 determined in a concentration of 0.5 g per 100 ml of para-chlorophenol at a temperature of 50° C.

The polyimide solution was spread on a smooth surface of a horizontal glass plate at a temperature of 25° C. to form a thin layer of the polyimide solution having a thickness of 0.2 mm. The polyimide solution layer was immersed in a coagulating liquid consisting of methyl alcohol at a room temperature of 25° C. for approximately 20 hours to form a coagulated porous polyimide membrane. The coagulated membrane was withdrawn from the coagulating liquid and dried at a temperature of 100° C. for one hour. Thereafter, the dried membrane was heat-treated at a temperature of 200° C. for 2 hours. A porous polyimide membrane was obtained.

The porous polyimide membrane had a thickness of 25 microns and exhibited a hydrogen gas-permeability ($P_{H_2}$) of $7.8 \times 10^{-2}$ cm$^3$/cm$^2$.sec.cmHg and a ratio ($P_{H_2}/P_{CO}$) of 3.1.

EXAMPLE 2 (PREPARATION OF POLYAMIC ACID DOPE SOLUTION A)

The same type of separable flask as that described in Example 1 was charged with 40 millimoles of 3,3',4,4'-biphenyltetracarboxylic dianhydride (s-BPDA), 40 millimoles of 4,4'-diaminodiphenyl ether (DADE), and 178 g of N-methyl-2-pyrrolidone (NMP). The reaction mixture was subjected to a polymerization procedure at a temperature of 20° C. for 7.5 hours while flowing nitrogen gas through the flask to prepare a solution containing an aromatic polyamic acid dissolved in NMP and having a logarithmic viscosity of 1.95 in a concentration of 0.5 g per 100 ml of NMP at a temperature of 30° C.

The resultant polyamic acid solution was diluted with NMP and dioxane so as to provide a dope solution A containing 1% by weight of the polyamic acid dissolved in a solvent consisting of 1 part by weight of NMP and 2.5 parts by weight of dioxane.

EXAMPLE 3 (PREPARATION OF POLYAMIC ACID DOPE SOLUTION B)

The same type of separable flask as that described in Example 1 was charged with 12 millimoles of pyromellitic dianhydride (PMDA), 12 millimoles of 4,4'-diaminodiphenylether (DADE), and 94.5 g of formamide. The reaction mixture in the flask was stirred at a temperature of 20° C. for 6 hours while flowing nitrogen gas through the flask. The resultant solution contained an aromatic polyamic acid having a logarithmic viscosity of 0.28 determined in the concentration of 0.5 g per 100 ml of NMP at a temperature of 30° C.

The solution was diluted with formamide so as to provide a dope solution B containing 3% by weight of the polyamic acids dissolved in formamide.

EXAMPLE 4 (PREPARATION OF POLYAMIC ACID DOPE SOLUTION C)

The same polymerization procedure as that described in Example 2 was carried out except that the polymerization time was changed to 14 hours. The aromatic polyamic acid contained in the resultant polymerization solution exhibited a logarithmic viscosity of 2.6 determined in a concentration of 0.5 g per 100 ml of NMP at 30° C.

The resultant polymerization solution was mixed with a large amount of methyl alcohol so as to cause the polyamic acid to precipitate. The precipitated polyamic acid was isolated from the polymerization solution and, then, uniformly dissolved in a concentration of 1% by weight in dimethylsulfoxide (DMSO).

A polyamic acid dope solution C was obtained.

EXAMPLE 5

The same aromatic polyimide porous membrane substrate as that described in Example 1 was immersed in the polyamic acid dope solution A described in Example 2 at a temperature of 20° C. for 20 minutes and, then, was removed from the dope solution A so as to form a thin layer of the dope solution A having a thickness not exceeding 0.5 microns on the two surfaces of the porous membrane substrate.

The resultant precursory composite membrane consisting of the porous membrane substrate coated with the dope solution A was dried in a nitrogen gas atmosphere at a temperature of 20° C. for approximately 2 hours and, then, at a temperature of 100° C. for one hour, so as to solidify the coated thin layer of the dope solution A by evaporating most portion of the solvent in the coated thin layer.

The solidified thin layer was heated at a temperature of 200° C. for 2 hours so as to convert the polyamic acid in the coated thin layer to the corresponding polyimide by imide-cyclizing the amide-acid structure in the polyamic acid. An aromatic polyimide composite separating membrane was obtained.

The results of the gas-permeating test applied to the resultant composite separating membrane are indicated in Table 1.

EXAMPLE 6

The same procedure as those described in Example 5 were carried out except that the polyamic acid dope solution B described in Example 3 was used in place of the dope solution A, and the drying time of the coated thin layer of the dope solution B was changed to 14 hours.

The results of the gas-permeating test applied to the resultant composite membrane are indicated in Table 1.

EXAMPLE 7

The same procedures as those described in Example 5 were carried out except that the polyamic acid dope solution C described in Example 4 was used in place of the dope solution A, and the drying time of the coated thin layer of the dope solution C was changed to 18 hours.

The results of the gas-permeating test applied to the resultant composite membrane are shown in Table 1.

EXAMPLE 8

The same procedures as those described in Example 5 were carried out except that the porous membrane substrate was immersed in carbon disulfide at room temperature for 20 minutes before the polyamic acid dope solution A was applied to the porous membrane substrate, and the drying time of the coated thin layer of the dope solution A was changed to 14 hours.

The results of the gas-permeating test applied to the resultant composite membrane, are shown in Table 1.

EXAMPLE 9

The same procedures as those described in Example 8 were carried out, except that carbon disulfide was replaced by methylethyl ketone.

The results of the gas-permeating test applied to the resultant composite separating membrane are indicated in Table 1.

TABLE 1

| | Polyamic acid dope solution | | | | | Gas-permeating property | |
|---|---|---|---|---|---|---|---|
| Example No. | Type | Type of carboxylic acid component | Type of diamine component | Logarithmic viscosity | Solvent | Hydrogen gas-permeability ($cm^3/cm^2$ sec cmHg) | Gas-separating property represented by ratio ($P_{H_2}/P_{CO}$) |
| 5 | A | s-BPDA | DADE | 1.95 | NMP-dioxane mixture (1:2.5) | $7.3 \times 10^{-6}$ | 20 |
| 6 | B | PMDA | " | 0.28 | Formamide | $9.0 \times 10^{-6}$ | 85 |
| 7 | C | s-BPDA | " | 2.6 | DMSO | $6.2 \times 10^{-6}$ | 31 |
| 8 | A | " | " | 1.95 | NMP-dioxane mixture (1:2.5) | $3.7 \times 10^{-6}$ | 28 |
| 9 | A | " | " | 1.95 | NMP-dioxane mixture (1:2.5) | $5.1 \times 10^{-6}$ | 81 |

We claim:

1. A process for producing an aromatic polyimide composite separating membrane, comprising the steps of:

coating at least one surface of a porous membrane substrate comprised of an aromatic polyimide which contains at least 80 molar % of at least one recurring unit of the formula (I):

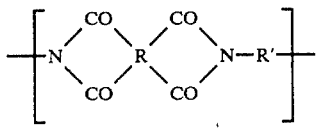

wherein R represents an aromatic tetravalent radical and R' represents an aromatic divalent radical, with a homogeneous solution containing 0.05% to 10% by weight of an aromatic polyamic acid dissolved in an organic polar solvent capable of dissolving said polyamic acid therein, but not capable of dissolving said polyimide membrane substrate, at a temperature of 140° C. or less, to form a thin layer of said polyamic acid solution; and after or during drying said thin layer of said polyamic acid solution by evaporating said solvent therefrom, heating the resultant polyamic acid coating layer at a temperature of 150° C. or more, whereby the amideacid structure in said polyamic acid is imide-cyclized to convert said polyamic acid coating layer to the corresponding polyimide coating layer.

2. An aromatic polyimide composite separating membrane produced in accordance with the process as claimed in claim 1.

3. The process as claimed in claim 1, wherein said aromatic polyimide porous membrane substrate has a permeability ($P_{H_2}$) of hydrogen gas of $5 \times 10^{-5}$ to $5 \times 10^{-1}$ cm³/cm².sec.cmHg and exhibits a ratio of the permeability ($P_{H_2}$) of hydrogen gas to a permeability ($P_{CO}$) of carbon monoxide gas of 2.0 to 10.0.

4. The process as claimed in claim 1, wherein the aromatic tetravalent radical represented by R in the formula (I) is a residue of an aromatic tetracarboxylic acid from which the four carboxylic acid moieties have been excluded.

5. The process as claimed in claim 1, wherein said aromatic divalent radical represented by R' in the formula is a residue of an aromatic diamine from which the two amino moieties have been excluded.

6. The process as claimed in claim 1, wherein said polyimide in said porous membrane substrate is a polymerization-imidization product of an aromatic tetracarboxylic acid component and an aromatic diamine component.

7. The process as claimed in claim 6, wherein the tetracarboxylic acid component comprises at least one member selected from the group consisting of biphenyl tetracarboxylic acids, benzophenone tetracarboxylic acids, 2,2-bis(dicarboxyphenyl)propane, bis(3,4-dicarboxyphenyl)-methane, bis(3,4-dicarboxyphenyl)sulfone, bis(3,4-dicarboxyphenyl)ether, bis(3,4-dicarboxyphenyl)thioether, pyromellitic acid, and acid anhydrides, salts, and lower alcohol esters of the above-mentioned acids.

8. The process as claimed in claim 6, wherein the diamine component comprises at least one member selected from the group consisting of those of the formulae (II) through (V)

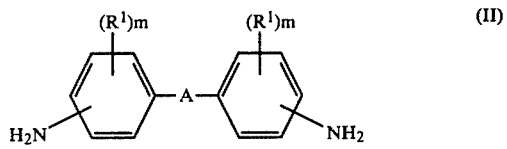

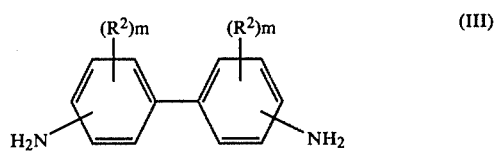

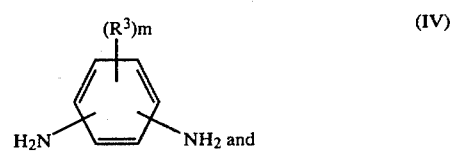

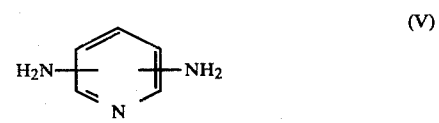

wherein $R^1$, $R^2$ and $R^3$ each represent, independently from each other, a member selected from the group consisting of hydrogen atom, lower alkyl radicals having 1 to 3 carbon atoms, and lower alkoxyl radicals having 1 to 3 carbon atoms: A represents a divalent linking member selected from the class consisting of —O—, —S—, —CO—, —SO$_2$—, —SO—, —CH$_2$— and —C(CH$_3$)$_2$—; and m represents an integer of from 1 to 4.

9. The process as claimed in claim 1, wherein said polyimide porous membrane substrate has a thickness of from 2 to 500 microns.

10. The process as claimed in claim 1, wherein said polyamic acid contains at least 60 molar % of at least one type of recurring unit of the formula (VI):

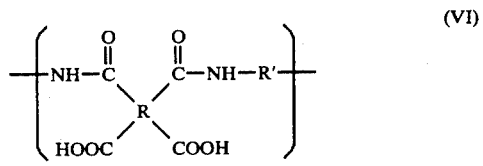

wherein R and R' are the same as defined above.

11. The process as claimed in claim 1, wherein said polar solvent comprises at least one member selected from the group consisting of acetamide, formamide, N-methyl-2-pyrrolidone, N,N-dimethylacetamide, N,N-diethylacetamide, N,N-dimethylformamide, N,N-diethylformamide, N-methylcaprolactam, dimethylsulfoxide, diethylsulfoxide, tetramethylurea, tetraethylurea, dioxane, trioxane and glycol compounds.

12. The process as claimed in claim 1, wherein said polyamic acid has a logarithmic viscosity of from 0.1 to 7, determined in a concentration of 0.5 g per 100 ml of N-methyl-2-pyrrolidone at a temperature of 30° C.

13. The process as claimed in claim 1, wherein said polyamic acid solution has a rotation viscosity of 0.01 to 1000 poise at a temperature of 30° C.

14. The process as claimed in claim 1, wherein said coating procedure is carried out at a temperature of 120° C. or less.

15. The process as claimed in claim 1, wherein said thin layer of said polyamic acid solution has a thickness of from 0.1 to 200 microns.

16. The process as claimed in claim 1, wherein before said coating procedure is carried out, said polyimide porous membrane substrate is impregnated with a liquid consisting of at least one member selected from lower aliphatic alcohols, lower aliphatic ketones, benzene type liquid compounds, lower aliphatic carboxylic esters, aliphatic hydrocarbons, and cycloaliphatic hydrocarbons.

17. The process as claimed in claim 1, wherein before said heating procedure is carried out, the drying procedure is carried out at a temperature of from 30° C. to 150° C.

18. The process as claimed in claim 1, wherein said heating procedure is carried out at a temperature of from 160° C. to 300° C.

19. The process as claimed in claim 1, wherein the resultant polyimide coating layer is a dense layer having a thickness of 5 microns or less.

20. The process as claimed in claim 1, wherein the polyimide in said coating layer is of the same type as the polyimide in said porous membrane substrate.

* * * * *